W. H. SMITH.
Corn Husker.
No. 15,985.  Patented Oct. 28, 1856.
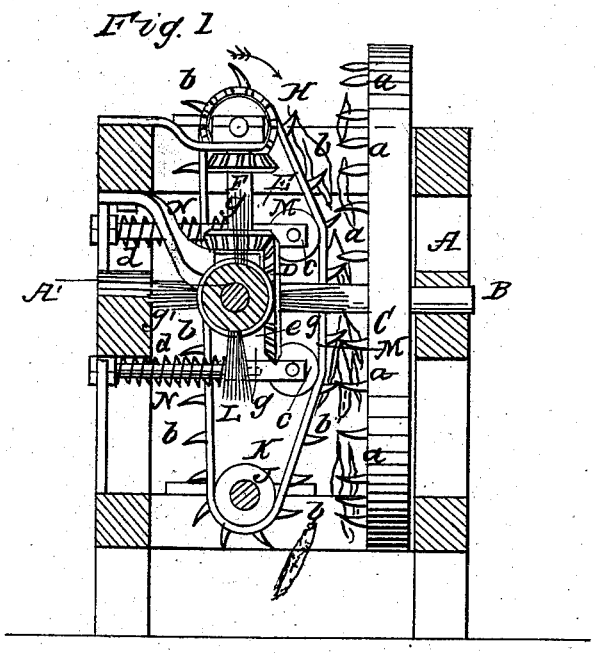
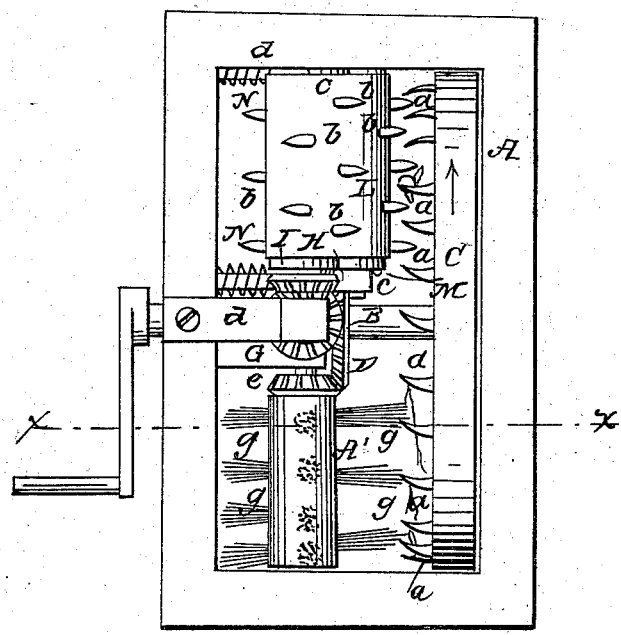

UNITED STATES PATENT OFFICE.

WM. H. SMITH, OF NEWPORT, RHODE ISLAND.

MACHINE FOR HUSKING CORN.

Specification of Letters Patent No. 15,985, dated October 28, 1856.

*To all whom it may concern:*

Be it known that I, WILLIAM H. SMITH, of Newport, in the county of Newport and State of Rhode Island, have invented a new and Improved Machine for Husking Corn; and I do hereby declare that the following is a full, clear, and exact description of the same, reference being had to the annexed drawings, making a part of this specification, in which—

Figure 1, is a transverse vertical section of the same, $x$, $x$, Fig. 2, showing the plane of section. Fig. 2, is a plan or top view of ditto.

Similar letters of reference indicate corresponding parts in the two figures.

My invention consists in the employment or use of a revolving toothed disk wheel, elastic or yielding toothed apron and stripping brush, the above parts being arranged and operating conjointly as will be hereinafter fully shown and described.

To enable those skilled in the art to fully understand and construct my invention, I will proceed to describe it.

A represents a rectangular frame which may be constructed in any proper manner to support the working parts.

B, represents a shaft which is placed transversely in the frame A. This shaft has a disk wheel C, upon it at one end, said wheel being within the frame A.

The inner side of the wheel C, has hooked or curved teeth $a$, driven into it, said teeth being of a suitable length and extending from the center to the edge of the wheel.

D, represents a bevel toothed wheel which is secured on the shaft B. This wheel gears into a bevel toothed pinion E which is placed on the lower end of a vertical shaft F, in the frame A.

The upper end of the shaft F, has a bevel toothed pinion G, upon it, and this pinion gears into a corresponding pinion H which is placed on the end of a drum or roller I, said drum being on the upper part of the frame A.

J, represents a shaft which is placed longitudinally in the lower part of the frame A. This shaft has a drum K upon it, said drum being in line with and underneath the drum I.

L, represents an endless apron which passes around the two drums I, K. This apron is provided with hooked teeth $b$, which are similar to the teeth $a$, on the disk wheel C.

M, M, represent two rollers which are placed within the apron L. These rollers have their journals fitted in bearings $c$, which work on the ends of horizontal rods $d$, attached to the frame A. A spring N, is placed on each rod $d$, said springs acting against the bearings $c$.

The bevel toothed wheel D, gears into a pinion $e$, which is placed on the end of a double cylinder $A^1$, the brushes $g$, being attached to its periphery.

The operation is as follows: Motion is given the disk wheel, endless apron and brush cylinder by rotating the shaft B. The apron L, moves considerably slower than the wheel C, and the direction of movement of each is shown by the red arrows. The ears of corn, shown in red, pass down between the apron L and disk wheel C, and the husks are stripped from them by the teeth on the apron and wheel. The apron is allowed to yield or give according to the size of the ears by means of the springs N, which have sufficient elasticity to allow the ears to pass down between the apron and wheel without causing the corn to be shelled from the ears. The brush cylinder strips the husks from the teeth $a$, of the disk wheel.

Having thus described my invention what I claim as new and desire to secure by Letters Patent, is—

The combination of the toothed disk-wheel C, elastic endless apron L, and brush cylinder $A^1$, arranged and operating conjointly as shown for the purpose specified.

WILLIAM H. SMITH.

Witnesses:
J. EDWARD NICOLAI,
C. H. PEABODY.